UNITED STATES PATENT OFFICE.

WALTER HEINRICI, OF HALLE-ON-THE-SAALE, GERMANY.

STABLE SOLUTION OF PEROXID OF HYDROGEN.

No. 825,883.　　　　Specification of Letters Patent.　　　　Patented July 10, 1906.

Application filed July 10, 1905. Serial No. 269,083.

*To all whom it may concern:*

Be it known that I, WALTER HEINRICI, doctor of philosophy, a subject of the Prince of Schwarzburg-Sondershausen, residing at Markt 17, Halle-on-the-Saale, in the German Empire, have invented certain new and useful Improvements in Stable Solutions of Peroxid of Hydrogen, of which the following is a specification.

The present invention relates to stable solutions of peroxid of hydrogen.

It is well known that diluted solutions of peroxid of hydrogen, especially watery solutions of the latter—*e. g.*, solutions containing up to ten per cent. or more of said peroxid—decompose in a comparatively short time. Therefore it has been proposed to add to such solutions special preserving means—such as alcohol, ether, boric acid, &c.; but these preserving means had not succeeded in preserving the said solutions for a sufficiently long time. Also comparatively strong acids, as sulfuric acid, hydrochloric acid, acetic acid, or the like, have been proposed for the said purpose of preserving solutions of peroxid of hydrogen. Such preserving means have been successful relating to the preserving action. These acids are, however, inconvenient for many purposes (such as for disinfecting or bleaching sensitive or delicate bodies or articles or parts thereof—*e. g.*, for disinfecting the mouth or bleaching delicate fabrics, &c.;) of using solutions of peroxid of hydrogen containing said preserving acids.

By experiences I have found that diluted solutions of peroxid of hydrogen (even containing no more than three per cent. of said peroxid) can be rendered stable for a long time—*e. g.*, for many months—by the addition of comparatively small proportions of such organic combinations, which can be considered as derivatives of ammonia. Such combinations are, first, acidylamids, such as acetamid, benzamid; second, acidylimids, such as succinimid, phthalimid; third, acidyl derivatives of aromatic bases, such as acetanilid, phenacetin, lactophenin, paratoluol-p-triphenetidid; fourth, acidyl derivatives of urea, such as the phenyl or benzyl derivatives of urea; methyluracil. Such stable solutions of peroxid of hydrogen form the subject-matter of the present invention. A solution of peroxid of hydrogen—*e. g.*, containing three per cent. of said peroxid—decomposes, as it is known, at ordinary temperature so rapidly that after eight to fourteen days only about one-half the peroxid is found undecomposed. If, however, to the said solution a small proportion—*e. g.*, several grams or less for one liter of the diluted solution of peroxid of hydrogen—of these compounds—such as of benzamid, phthalimid, phenacetin, succinimid, lactophenin, &c.—has been added, said solution is found to be practically permanent, as can be seen from the fact that even after several months a remarkable decrease of the amount of peroxid of hydrogen or a remarkable formation of any acid cannot be established.

What I claim as my invention is—

Stable solution of peroxid of hydrogen containing a small proportion of an organic amido derivative substantially as and for the purpose set forth.

In testimony whereof I have signed my name to this specification in the presence of two subscribing witnesses.

WALTER HEINRICI.

Witnesses:
　RUDOLPH FRICKF
　S. P. WARNER.